United States Patent [19]

Nishikawa et al.

[11] Patent Number: 4,808,202

[45] Date of Patent: Feb. 28, 1989

[54] ADSORPTIVE FIBER SHEET

[75] Inventors: Yasuo Nishikawa, Uji; Yasumasa Nakazima, Joyo, both of Japan

[73] Assignee: Unitka, Ltd., Amagasaki, Japan

[21] Appl. No.: 123,871

[22] Filed: Nov. 23, 1987

[30] Foreign Application Priority Data

Nov. 27, 1986 [JP] Japan .................. 61-280779
Nov. 28, 1986 [JP] Japan .................. 61-281660
Sep. 7, 1987 [JP] Japan ............. 62-135551[U]

[51] Int. Cl.⁴ ................................................ B01D 39/00
[52] U.S. Cl. ...................................... 55/390; 55/488;
428/36; 428/297; 428/299; 428/300; 428/373;
428/408; 428/913
[58] Field of Search ............... 428/297, 284, 300, 408,
428/913, 373, 299, 36; 55/390, 488

[56] References Cited

U.S. PATENT DOCUMENTS

| | | | |
|---|---|---|---|
| 4,255,171 | 3/1981 | Dravnicks | 55/390 |
| 4,540,625 | 9/1985 | Sherwood | 428/408 |
| 4,548,678 | 10/1985 | Laflen et al. | 428/408 |
| 4,681,801 | 7/1987 | Elan et al. | 428/408 |
| 4,701,189 | 10/1987 | Oliker | 55/390 |

*Primary Examiner*—James J. Bell
*Attorney, Agent, or Firm*—Larson & Taylor

[57] ABSTRACT

An adsorptive fiber sheet where a nonwoven fabric of synthetic fiber constituted only by synthetic fiber having a higher melting temperature is secured in a layered structure to at least one surface of a nonwoven fabric of adsorptive fiber which is produced in such a manner that synthetic fiber having a higher melting temperature, synthetic fiber having a lower melting temperature and adsorptive fiber are mixed with one another and contact points between the synthetic fiber having a lower melting temperature and other fibers are bound together by softening the synthetic fiber having a lower melting temperature. Both the synthetic fabrics are placed one above another in a layered structure by allowing synthetic fiber having a lower melting temperature to be softened to bind or by allowing fibers to be entangled with one another in such a manner that no separation takes place therebetween.

15 Claims, 4 Drawing Sheets

ADSORPTIVE FIBER SHEET

BACKGROUND OF THE INVENTION

1. Field of the Invention

The present invention relates to an adsorptive fiber sheet wherein a nonwoven fabric of synthetic fiber constituted only by synthetic fiber having a higher melting temperature is secured in a layered structure to at least one surface of a nonwoven fabric of adsorptive fiber which is produced in such a manner that synthetic fiber having a higher melting temperature, synthetic fiber having a lower melting temperature and adsorptive fiber are mixed with one another and contact points between the synthetic fiber having a lower melting temperature and other fibers are bound together by softening the synthetic fiber having a lower melting temperature.

2. Description of the Prior Art

Heretofore, pulverized or granular activated carbon and ion exchange resins are widely known in the art as adsorbent for removing various kinds of foreign materials such as bad-smelling components, coloring components and specific noxious chemicals in gas or liquid. In order to use these activated carbon and ion exchange resins as means for removing bad-smelling components, coloring components and specific noxious chemicals in gas or liquid, they are charged in a defined section between filter-shaped members disposed in a passage for gas flow or liquid flow which is generated by a pump. However, since they are adapted to function as adsorbent in the defined section, there is a need of providing a considerably high intensity of pressure for feeding gas or liquid or there is another need of allowing the adsorbent to be prepared in a comparatively large granular size, resulting in an adsorbing efficiency being reduced. It should be noted that these drawbacks are unavoidable.

To obviate the drawbacks as mentioned above, a technique as disclosed in the official gazette of Japanese Utility Model Publication No. 2025/1982 which was published in 1982, has been developed. This latest technique is concerned with an adsorptive filter sheet which is so constructed that a felt-shaped protective and dust collecting filter comprising glass fiber is placed on one surface or both surfaces of a felt-shaped sheet comprising activated carbon fiber to build a layered structure and the former is lightly attached to the latter by needle punching. However, it is found as an inconvenience that the obtained adsorptive filter sheet can not be used for a long period of time because the activated carbon fiber is not adhesively secured to other fibers and easy to be damaged or injured.

BRIEF SUMMARY OF THE INVENTION

The present invention has been made with the foregoing background in mind. The present invention comprises in an absorptive sheet which is characterized in that a nonwoven fabric of synthetic fiber constituted only by synthetic fiber having a higher melting temperature is secured in a layered structure to at least one surface of a nonwoven fabric of adsorptive fiber which is produced in such a manner that synthetic fiber having a higher melting temperature, synthetic fiber having a lower melting temperature and adsorptive fiber are mixed with one another and contact points between the synthetic fiber having a lower melting temperature and other fibers are bound together by softening the synthetic fiber having a lower melting temperature.

A main object of the present invention is to provide an adsorptive fiber sheet which has a high adsorption efficiency for bad-smelling components, coloring components, specific noxious chemicals or the like in gas or liquid, and has excellent porosity, air permeability and includes adsorptive fiber which is firmly held without any fear that it is lost by flowing away in gas or liquid.

Another object of the present invention is to provide an adsorptive fiber sheet which can be used for a long period of time without an occurrence of remarkable reduction of adsorptive power due to removement of dust and mist.

Another object of the present invention is to provide an adsorptive fiber sheet which can adsorb and remove a variety of foreign materials including polar material such as chloride ion, ammonium ion or the like in gas or liquid.

To accomplish the above objects, there is provided, in accordance with one aspect of the present invention, an adsorptive fiber sheet wherein a nonwoven fabric of synthetic fiber constituted only by synthetic fiber having a higher melting temperature is secured in a layered structure to at least one surface of a nonwoven fabric of adsorptive fiber which is produced in such a manner that synthetic fiber having a higher melting temperature, synthetic fiber having a lower melting temperature and adsorptive fiber are mixed with one another and contact points between the synthetic fiber having a lower melting temperature and other fibers are bound together by softening the synthetic fiber having a lower melting temperature.

Further, there is provided, in accordance with another aspect of the present invention, an adsorptive fiber sheet wherein a nonwoven fabric of synthetic fiber constituted by a mixture of synthetic fiber having a higher melting temperature and synthetic fiber having a lower melting temperature is secured in a layered structure to at least one surface of a nonwoven fabric of adsorptive fiber which is produced in such a manner that synthetic fiber having a higher melting temperature, synthetic fiber having a lower melting temperature and adsorptive fiber are mixed with one another and contact points between the synthetic fiber having a lower melting temperature and other fibers are bound together by softening the synthetic fiber having a lower melting temperature.

The above and other objects, features and advantages of the present invention will be readily apparent from a reading of the following description which has been made with reference to the accompanying drawings.

BRIEF DESCRIPTION OF THE DRAWINGS

The present invention will be illustrated below in the following drawings which show the fundamental structure of an adsorptive fiber sheet in accordance with the invention and several application examples of the fiber sheet.

DESCRIPTION OF THE PREFERRED EMBODIMENTS

Now, the present invention will be described in greater detail hereunder with reference to the accompanying drawings which illustrate preferred embodiments thereof.

First, description will be made below as to an adsorptive fiber sheet in accordance with an embodiment of the present invention with reference to FIG. 1 which illustrates the fundamental structure of the adsorptive fiber sheet.

Figure 1:
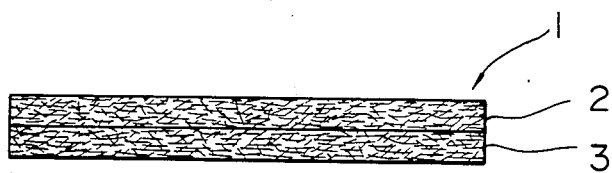
FIG. 1 is a front view of an adsorptive fiber sheet in accordance with an embodiment of the invention, particularly illustrating the fundamental structure of the adsorptive fiber sheet.

In FIG. 1, reference numeral 1 designates an adsorptive fiber sheet in accordance with an embodiment of the invention. The adsorptive fiber sheet 1 is composed of a nonwoven fabric 2 of adsorptive fiber and a nonwoven fabric 3 of synthetic fiber to build a fundamental structure. As is apparent from the drawing, the nonwoven fabric 3 is attached to the lower surface of the nonwoven fabric 2 in a layered structure in such a manner that the former is not separated from the latter.

The nonwoven fabric 2 is produced by way of the steps of mixing the adsorptive fiber such as activated carbon fiber, ion exchange fiber or the like with synthetic fiber having a higher melting temperature and synthetic fiber having a lower melting temperature and then binding together the thus mixed synthetic fiber having a lower melting temperature and synthetic fiber having a higher melting temperature as well as synthetic fiber having a lower melting temperature and adsorptive fiber at their contact points due to softening of synthetic fiber having a lower melting temperature.

Incidentally, it is not necessarily required that synthetic fiber having a higher melting temperature is separated from synthetic fiber having a lower melting temperature but they may be made integrally to form conjugated fiber comprising synthetic high polymer having a higher melting temperature and synthetic high polymer having a lower melting temperature. For instance, it is particularly preferable that conjugated fiber comprises synthetic high polymer having a higher melting temperature as a core and synthetic high polymer having a lower melting temperature as a sheath besides side-by-side type conjugated fiber.

On the other hand, activated carbon fiber is obtainable by way of the steps of producing optically isotropic fiber-forming pitch by polymarization of coal tar, forming pitch fiber by spinning the thus produced pitch in a molten state, allowing the formed pitch fiber not to melt (stabilizing) by treating it at a temperature in the range of 200° to 400° C. in an oxidative gas and then converting it to an activated state by carrying out activating reaction at a temperature in the range of 600° to 1000° C. in an activating gas. Incidentally, besides the above-mentioned fiber-forming pitch those which are produced by processing various kinds of petroleum-based or coal-based heavy oils can be used. Further, optically anisotropical pitch may be employed.

By carrying out the step of allowing the pitch fiber not to melt, the activated carbon fiber has an enlarged network structure and moreover by carrying out the step of converting the pitch fiber to an activated state, it has a large number of micropores having a diameter in angstrom units produced on the surface thereof, resulting in a remarkably increased surface area. Adsorption of foreign material in gas and liquid such as bad-smelling components, coloring components, specific chemicals is achieved with the aid of these micropores. The kind of material to be adsorbed is determined by diameter of the micropores, and an amount of material to be adsorbed is determined by number, diameter and depth of the micropores. Although diameter, number, depth or the like of the micropores vary in dependence on raw material and production conditions, it is preferable that each of the micropores has a specific surface area in the range of 500 to 2500 $m^2/g$. Further, it is preferable that diameter of the activated carbon fiber is determined, for instance, in the range of 7 to 25 microns. The activated carbon fiber may be either filament fiber or staple fiber. In the case where filament fiber is employed, nonwoven fabric of filament fiber is produced by way of the steps of drawing a number of fibers extruded through a spinning nozzle under the influence of air flow, dispersing them in the air and then randomly depositing them on a web forming machine. On the other hand, in the case where staple fiber is employed, nonwoven fabric of staple fiber is produced by cutting the fiber of the aforesaid nonwoven fabric or cutting the filament fibers to a suitable length and then forming the nonwoven fabric using the obtained staple fibers. By using the activated carbon fiber, bad-smelling materials such as hydrogen sulfide, methyl sulfide, methyl mercaptan, trimethyl amine, ammonia or the like can be removed. Moreover, coloring matter, humin-based material, phenol, chlorinated hydrocarbon or the like can be removed.

The ion exchange fiber is the fiber produced by resin including ion exchange group such as anion exchange group, cation exchange group, chelate group or the like. As anion exchange group there is known a basic exchange group which is obtained by processing halo alkylated fiber with the use of tertiary amine such as trimethyl amine or the like or secondary amine such as dipropyl amine or the like. As cation exchange group there are known strong acid cation exchange group which is obtained with the use of chrlorosulfonic acid or the like and weak acid cation exchange group which is obtained with the use of carboxylic acid or the like. Further, as chelate group there is known chelate forming functional group such as iminodiacetic acid or the like. However, the present invention should not be limited only to the ion exchange groups as mentioned above. By using the ion exchange fiber, acid gas such as hydrogen sulfide, hydrogen halide, sulfurous acid gas or the like can be removed. Moreover, polar material such as chromic acid, amines or the like can be removed.

As synthetic fiber having a higher melting temperature to be mixed with adsorptive fiber, various kinds of synthetic fibers such as polyester, polyolefine, polyamide or the like are used. As synthetic fiber having a lower melting temperature, it is preferable to use those which have softening temperature lower than that of synthetic fiber having a higher melting temperature by at least 40° C. Although both synthetic fiber having a higher melting temperature and synthetic fiber having a lower melting temperature are preferably of same group, a combination of kinds of synthetic fibers is employable, provided that they have affinity therebetween.

In the case where both synthetic fibers comprise polyester, it is preferable that polyester having a softening temperature higher than 240° C. is used as synthetic fiber having a higher melting temperature and polyester having a softening temperature in the range of 100° to 150° C. is used as synthetic fiber having a lower melting temperature. Specifically, as synthetic fiber having a lower melting temperature, it is preferable that it is obtained by reaction which takes place among one kind of either dibasic acid or its derivative, one kind of glycols and one or more other kinds of dibasic acid or glycols. As one example there is known copolymerized polyester including terephthalic acid, isophthalic acid and ethylen glycol as main components. As synthetic fiber having a lower melting temperature, fiber of polyolefine, or the like can be used besides those as mentioned above. When polyester is used as both synthetic fibers, it is excellent in respect of bulkiness and elasticity restorability. As other fibers there is a case where polypropylene is used as synthetic fiber having a higher melting temperature and polyethylene, polystylene, ethylene-propylene copolymer or the like are used as synthetic fiber having a lower melting temperature.

As mentioned above, it is preferable that synthetic fiber having a higher melting temperature and synthetic fiber having a lower melting temperature are conjugated fiber and it is preferable that finess of the aforesaid conjugated fiber is less than 10 deniers. However, the present invention should not be limited only to this. Further, it is preferable that finess of the high polymer having a higher melting temperature in the conjugated fiber is in the range of ½ to 1/6 of finess of the whole conjugated fiber.

It is preferable that synthetic fiber having a higher melting temperature and synthetic fiber having a lower melting temperature are cut to a length of 50 to 150 mm and subjected to crimping in order to assure that blending by of means a card (to be described later) is effected satisfactorily and binding of them to the adsorptive fiber is achieved easily.

Next, description will be made below as to a preferred embodiment of the present invention with reference to FIG. 1. Adsorptive fiber, synthetic fiber having a higher melting temperature and synthetic fiber having a lower temperature are supplied to a card or the like machine in which they are dispersed and mixed with one another to form a web and the obtained web is transferred to a hot air furnace or the like means in which it is heated up to an intermediate temperature between the softening temperature of the synthetic fiber having a higher melting temperature and the synthetic fiber having a lower melting temperature in order that the synthetic fiber having a lower temperature is softened to bind other fiber at their contact points. Thus, a nonwoven fabric 2 of adsorptive fiber which is excellent in respect of strength, bulkiness and elasticity restorability is obtained, as shown in FIG. 1.

Another nonwoven fabric 3 of synthetic fiber is secured to the lower surface of the obtained nonwoven fabric 2 of adsorptive fiber in a layer structure in such a manner that the former is not separated from the latter. The nonwoven fabric 3 is constituted only by synthetic fiber such as polyester, polyamide, polyolefin or the like or it is constituted by a mixture of the aforesaid synthetic fiber and synthetic fiber having a lower melting temperature wherein the synthetic fiber having a lower melting temperature is substantially equivalent to the fiber of the nonwoven fabric of 2 adsorptive fiber. It should be noted that the synthetic fibers having a higher melting temperature and a lower melting temperature may be conjugated fiber. Further, it should be noted that the nonwoven fabric of synthetic fiber may include adsorptive fiber therein.

In the case where both the nonwoven fabric 2 of adsorptive fiber and the nonwoven fabric 3 of synthetic fiber include synthetic fiber having a lower melting temperature, they can be bound together by softening the synthetic fiber having a lower melting temperature. Further, in the case where the nonwoven fabric 3 of synthetic fiber does not include synthetic fiber having a lower melting temperature, it is subjected to needling in order to assure that no separation takes place because fibers of the nonwoven fabrics 2 and 3 are entangled with one another.

Since the obtained adsorptive fiber sheet 1 includes the nonwoven fabric 3 of synthetic fiber in the form of a layered structure, it can remove dust, mist or the like foreign material which may reduce adsorptive force of the adsorptive fiber with the aid of the affinity force of the synthetic fiber to dust, mist or the like. The adsorptive fiber sheet 1 has an increased durability of adsorptive force.

Next, description will be made below as to an example of production of the adsorptive fiber sheet 1 as shown in FIG. 1.

As pitch usable as raw material for the activated carbon fiber nonwoven fabric 2, pitch having a softening temperature of 279.7° C. (measured in accordance with Metra's method), quinoline-based insoluble content (Q1) of 34.5% by weight and benzen-based insoluble content (B1) of 79.0% by weight (Analyzation of Q1 and B1 was carried out in accordance with Japanese Industrial Standard K-2425) was used. It was found as a result of visual observation with the use of a polarization microscope that this pitch was optically isotropic and exhibited noncrystal halo in respect of figure of X ray diffraction for powder material.

The aforesaid isotropic pitch of 100 Kg for the purpose of spinning was crushed at a room temperature and the crushed pitch was supplied to a melting portion of a spinning machine including a single screw extruder having a diameter of 40 mm. The pitch which was kept in a molten state at a temperature of 335° C. was discharged through the spinning nozzle having 128 extruding holes at a rate of 0.625 g/min. per extruding hole to produce pitch fiber. The produced pitch fibers were subjected to drawing by operating an air sucker and subjected to dispersing by operating an air blowing machine and then randomly deposited on a net conveyer to form a web. Then, the obtained web was heated up to a temperature of 200° C. from a room temperature for 30 minutes in an oxidative atmosphere ($No_2$ of 50% by volume) and thereafter it was heated up to a temperature of 400° C. for 90 minutes whereby it assumes such a state that it could not melt. Further, the web was subjected to activating at an activating temperature of 850° C. for 30 minutes using steam.

Adsorptive properties of this activated carbon fiber were represented by specific surface area of 1782 $m^2/g$ (measured in accordance with BET method), benzen adsorptive force of 45% by weight (measured in accordance with Japanese Industrial Standard K-174) and average diameter of micropore of 17 angstroms, while fibrous properties of the same were represented by diameter of fiber of 17 microns, fiber strength of 14 $Kg/mm^2$ measured in accordance with Japanese Industrial Standard R-7601, elastic modulus of 1100 $Kg/mm^2$ and elongation of 2.1%.

Fibrous binder (produced by Unitika Ltd. under the tradename of Melty and having 4 denier per fiber, fiber length of 51 mm, fiber strength of 3.2 g/denier, elongation of 45% and softening temperature of 110° C.) was added to the activated carbon fiber using a roller card with metallic wires of 15/1000 gauge to form a mixture web at a rate of 50 m/min. Incidentally, the fibrous binder was a conjugated fiber of which core portion was constituted by polyethylene terephthalate having a softening temperature of 240° C. and of which sheath portion was constituted by copolymerized polyester having a softening temperature of 110° C. The obtained web was subjected to needling at a density of one needle/$cm^2$ with the use of a needle punching machine and then compressed by means of a hot press roller while it was heated in order to adjust a thickness and set a structure of the web. Thus, a sheet was obtained.

On the other hand, with respect to the nonwoven fabric 3 of synthetic fiber, a polyethylene terephthalate fiber web was produced by means of a roller card using polyethylene terephthalate fiber having a sofetening point of 240° C. (finess of 2 denier per fiber, fiber length of 51 mm, fiber strength of 4.5 g/denier and elongation of 32%). Also in this case, the web was subjected to needling with the use of a needle punching machine.

After both the nonwoven fabrics 2 and 3 were laid one above another in a layered structure by means of a horizontal layer, they were subjected to needling at a density of one needle/$cm^2$ by means of a needle punching machine and they were then compressed by means of a hot press roller while they were heated in order to adjust a thickness and set a structure of the web. Thus, an uniform and flat sheet was produced.

Figure 2:
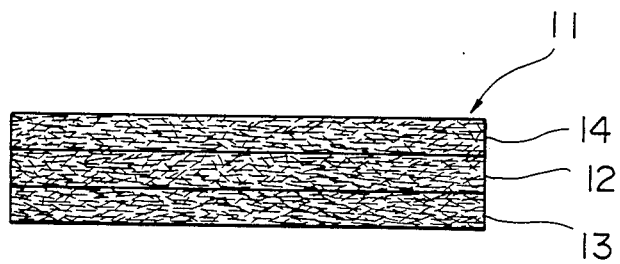
FIG. 2 is a front view of an adsorptive fiber sheet in accordance with another embodiment of the invention, particularly illustrating the fundamental structure of the adsorptive fiber sheet.

With reference to FIG. 2, which illustrates an adsorptive fiber sheet 11 having a fundamental structure of the invention, the adsorptive fiber sheet 11 is so constructed that nonwoven fabrics 13 and 14 of synthetic fiber are secured to both the surfaces of a nonwoven fabric 12 of adsorptive fiber in a layered structure in such a manner that they are not separated from the nonwoven fabric 12. The nonwoven fabric 12 of adsorptive fiber and the nonwoven fabrics 13 and 14 of synthetic fiber as mentioned above are a nonwoven fabric having the same structure as shown in FIG. 1 respectively. In the case where the nonwoven fabrics 13 and 14 include synthetic fiber having a lower melting temperature, securing of the nonwoven fabrics 13 and 14 of synthetic fiber to the nonwoven fabric 12 of adsorptive fiber is achieved by heat binding, while in the case where they do not include synthetic fiber having a lower melting temperature, the aforesaid securing is achieved by needling. Incidentally, either of the nonwoven fabrics of synthetic fiber may include synthetic fiber having a lower melting temperature and other may not include it. Further, in the case where the nonwoven fabrics 13, 14 of synthetic fiber are secured to both the surfaces of the nonwoven fabric 12 of adsorptive fiber in a layered structure, unexpected separation (dropping) of the adsorptive fiber and adhering of dirty material due to direct contact with the absorptive fiber can be prevented in addition to advantageous effects in the case of the first embodiment of the invention.

Besides, it is possible that a rigid sheet is embedded between the nonwoven fabrics 2 or 12 of adsorptive fiber and the nonwoven fabrics 3, 13 or 14 of synthetic fiber. As the rigid sheet, woven fabric, knitted fabric, net or the like made of metallic material or plastic material are employable. Since adsorptive fiber having a substantially low strength is reinforced with synthetic fiber and rigid sheet, the adsorptive fiber sheet has excellent strength and can be used in a wide scope of application.

Further, it is possible that various kinds of materials can be included in the nonwoven fabrics 2, 12 of adsorptive fiber and the nonwoven fabrics 3, 13 of synthetic fiber. For instance, when copper fiber having an extremely small diameter in the range of 20 to 40 microns is included in either of the layers constituting the adsorptive fiber sheet, bactericidal and anti-static properties can be improved. Further, when water absorptive fiber is included in that way, ability of water absorption can be improved.

Figure 3:
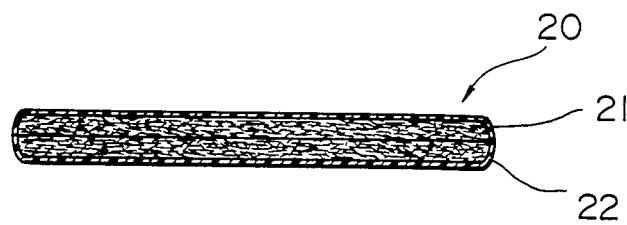
FIG. 3 is a vertical sectional front view of a waterproof adsorptive sheet including the adsorptive fiber sheet of the invention shown in FIG. 1 or FIG. 2, wherein the adsorptive fiber sheet is covered with an air permeable waterproof sheet.

A waterproofing adsorptive fiber sheet 20 as shown in FIG. 3 is so constructed that an adsorptive fiber sheet 21 equivalent to the adsorptive fiber sheets 1, 11 as described with reference to FIGS. 1 and 2 is covered with an air permeable waterproofing sheet 22. The air permeable waterproofing sheet 22 comprises hydrophobic plastic sheet having a large number of fine pores formed therethrough. As a plastic sheet, sheet of polyolefine, fluorocarbon resin, polyamino acid or the like is preferably employable. In order to form fine pores, various kinds of means such as laser beam radiation or the like are employable. It is preferable that each of the fine pores assumes a configuration which has a smaller diameter at both the ends and has a larger diameter at the middle part thereof. In order to assure such a configuration as mentioned above, it is preferable that each of the end parts of the pore is contracted or it is added with other material which will be solidified later. When the plastic sheet has a number of fine pores of which end part is narrowed, the result is that the sheet is excellent in waterproofness and moreover it is excellent in air permeability and moisture permeability. The adsorptive fiber sheet 21 may be equivalent to the nonwoven fabrics 2, 12 of adsorptive fiber as mentioned above. The thus obtained waterproofing adsorptive sheet 20 can be used as it is. Moreover, it can be used in such a manner that a water absorptive cloth or the like is placed over the outside thereof in the form of a layered structure or the outer periphery thereof is covered with a water absorptive cloth of cotton, wool, rayon or the like material or cloth of synthetic fiber or the like material.

The waterproofing adsorptive sheet 20 can be used as floor cloth and moreover it can be used as deodorization cloths.

The adsorptive fiber sheet of the invention as mentioned above can be used as cleaning filter for cleaning air in a factory, room or the like and for cleaning liquid containing coloring component or the like. In addition, it is employable for variuous kinds of applications in the form of medical goods such as mask, medical sheet, medical suit, base fabric for stupe, bandage or the like, or cover, diaper, physiological goods, dust bag for kitchen waste, curtain, glove, escaping means in the event of an occurence of fire or the like. Next, several examples of applications of the adsorptive fiber sheet of the invention will be described in the following.

Figure 4:
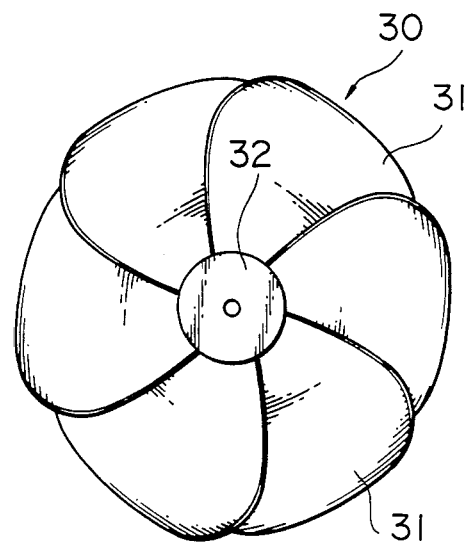
FIG. 4, FIG. 5 and FIG. 6 are plan views of a rotary type filters constituted by the adsorptive fiber sheet of the invention.

In FIG. 4 reference numeral 30 designates a filter. The filter 30 comprises a plurality of blades 31 of adsorptive fiber sheet and a boss 32. Each of the blades 31 of adsorptive fiber sheet assumes a substantially elliptic shape. However, the present invention should not be limited only to this. Alternatively, it may assume various shapes such as circular shape. The plurality of blades 31 of adsorptive fiber sheet are secured to the outer periphery of the boss 32 in an inclined state like propeller. When they are seen in the direction of feeding of air or liquid, the blades 31 of adsorptive fiber sheet are overlapped partially. Since the blades 31 of adsorptive fiber sheet are secured to the boss 32 in an overlapped relation, they come in contact with air or liquid at a high contact efficiency. Moreover, since they are secured to the boss 32 in an inclined state like a propeller, air or liquid flows without stoppage by the blades 31 of adsorptive fiber sheet and flows along the blades 31 of adsorptive fiber sheet after they come in contact with them. Thus, air or liquid passes through space between the adjacent blades 31 of adsorptive fiber sheet. As a result, feeding of air or liquid is achieved with minimized loss in pressure accompanied by energy saving.

Since the plurality of blades 31 of adsorptive fiber sheet are rotated by means of a shaft fitted through the boss 32, they come in contact with air or liquid at a further increased contact efficiency, resulting in foreign material such as bad-smelling material or the like being removed at a high operative efficiency.

Figure 5:
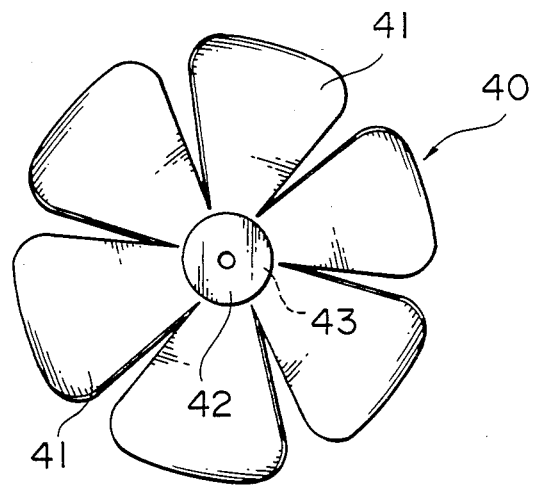
Figure 6:
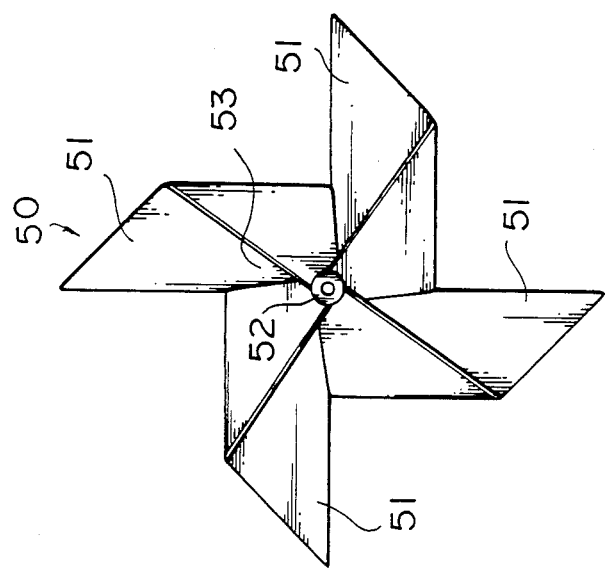

The blades 31 of adsorptive fiber sheet are made of the aforesaid adsorptive fiber sheet or nonwoven fabric of adsorptive fiber and it is particularly preferable that they are made of core-sheath type conjugated fiber. Each of the blades 31 of adsorptive fiber is constituted by a single layer of adsorptive fiber sheet 1 or 11 or nonwoven fabric 2 or 12 of adsorptive fiber. However, the present invention should not be limited only to this. Alternatively, it may be constituted in the form of a multi-layered structure of which outer layer is made of adsorptive fiber sheet 1, 11 or nonwoven fabric 2, 12 of adsorptive fiber and of which inner layer is made of net of metallic material or plastic material, paper, nonwoven fabric, molded product of plastic material or the like. In the case where impermeable material such as metallic material, plastic material or the like is employed for the inner layer, increased strength is obtained but removal of foreign material such as bad-smelling material or the like is achieved only by contact with gas or liquid because no gas or liquid passes therethrough. On the other hand, in the case where porous material having a higher strength such as net or the like is employed for the inner layer, not only increased strength is assured but also a further increased contact efficiency with gas or liquid is obtained due to the fact that gas or liquid can pass therethrough, resulting a removal efficiency for bad-smelling material or the like being increased. As shown in FIGS. 5 and 6, the rotary type filter may be such that a plurality of blades made of adsorptive fiber sheet are made integral with one another at the central part thereof. For instance, as shown in FIG. 5, a rotary type filter 40 may be made by way of the steps of forming a plurality of radially extending cutouts exclusive a central portion 43 using a circular adsorptive fiber sheet to form a plurality of blades 41, inclining each of the blades 41, causing them to be set thermally and then securing two bosses 42 to the central portion 43. Further, as shown in FIG. 6, a rotary type filter 50 may be made by way of the steps of forming cutting lines each of which extends from corners of a square fiber sheet toward the center part thereof to form a plurality of blades 51, folding one edge part of each of four blades 51 toward the center and then fixedly securing the folded blades 51 to two bosses 52 located at the center thereof.

Figure 7:
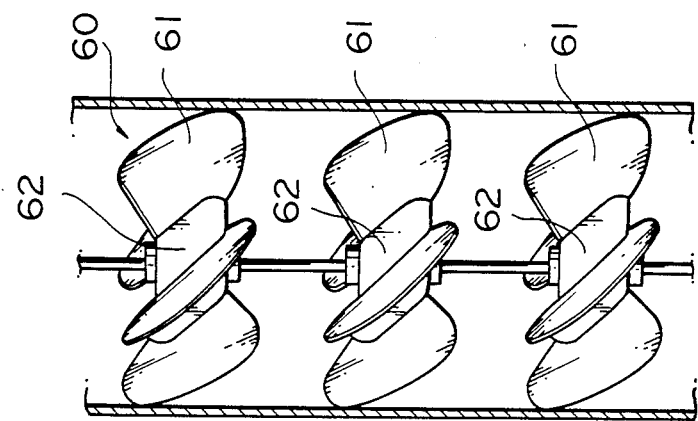
FIG. 7 is a front view of a plurality of rotary type filters as shown in FIG. 4, wherein the rotary type filters are rotatably mounted on a single shaft in an equally spaced relation and they are accommodated in a pipe through which air or liquid flows.

In order to increase a efficiency to contact with gas or liquid, it is possible to suitably change an area of each of blades of adsorptive fiber sheet, the number of blades and a distance between the adjacent blades. It should be noted that the rotary type filter may be firmly fixed to a rotational shaft in order to assure that they rotate positively. Further, as shown in FIG. 7, a plurality of rotary type filters 60 each of which comprises a plurality of blades 61 and a boss 62 may be arranged in the direction of feeding of air or liquid.

Besides the rotary type filters as shown in the drawings, there are known other various types of filters. They are excellent in contact efficiency with gas or liquid and moreover they can substantially completely adsorb and remove foreign material such as bad-smelling material, coloring material or the like in gas or liquid. Thus, they exhibit excellent practical advantageous effects.

The rotary type filters as mentioned above are used for the purpose of removing various foreign materials in gas (for instance, waste gas coming from a diazo type copying machine) or liquid and moreover they can remove bad-smelling material or the like in a room, refrigerator or the like.

Figure 8:
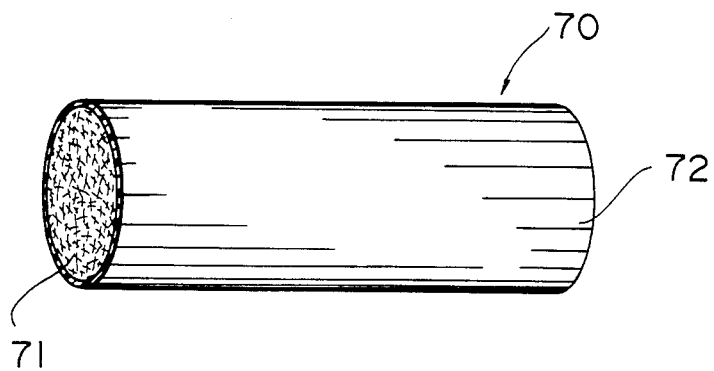
FIG. 8 is a perspective view of a column-shaped adsorptive fiber sheet of which outer periphery is covered with a water impermeable film, wherein the column-shaped adsorptive fiber sheet is produced by rolling the adsorptive fiber sheet of the invention as shown in FIG. 1 or FIG. 2 in the form of a column.
Figure 9:
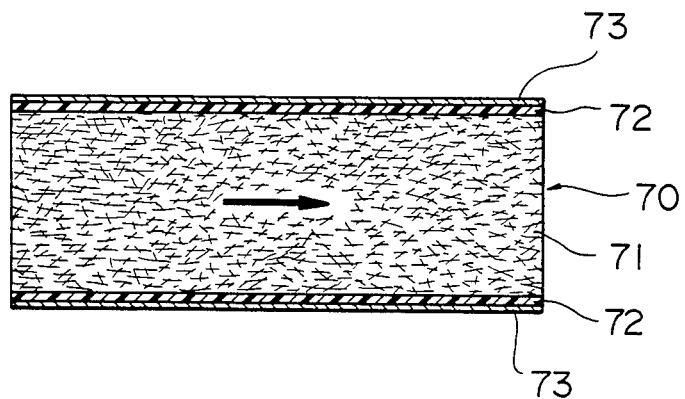
FIG. 9 is a vertical sectional view of the column-shaped adsorptive fiber sheet shown in FIG. 8.

In FIGS. 8 and 9, reference numeral 70 designates an adsorptive filter. The adsorptive filter 70 is such that a column-shaped adsorptive fiber 71 is covered with a water impermeable film 72. The water impermeable film 72 comprises a film made of synthetic resin such as polyethylene, polyvinyl chloride, polyamide, polyester or the like material. It is particularly preferable that it has a large extent of thermal shrinkage. In the case where the water impermeable film 72 has a large shrinkage, the film 72 shrinks to come in close contact with the column-shaped adsorptive fiber 71 when it is heated. The adsorptive filter 70 is used while it is fitted into a pipe 73. However, due to the fact that the column-shaped adsorptive fiber 71 is covered with the water impermeable film 72, there is no fear that liquid to be filtered leaks to the outside through the film 72. Further, any leakage of liquid from the end parts of the filter can be prevented by fitting to both the ends thereof a member for covering the outer peripheral area of the filter. Further, by determining the length of the impermeable film 72 longer than that of the column-shaped adsorptive fiber 71 and liquidtightly fixing an extended part of the film to the pipe, any leakage of liquid to be filtered can be prevented reliably.

While the present invention has been described above with respect to the preferred embodiments of the invention, it should of course be understood that it should not be limited only to them but various changes or modifications may be made in a suitable manner without any departure from the spirit and scope of the invention as defined by the appended claims.

What is claimed is:

1. An adsorptive fiber sheet wherein a nonwoven fabric of synthetic fiber constituted only by synthetic fiber having a higher melting temperature is secured in a layered structure to at least one surface of a nonwoven fabric of adsorptive fiber which is constituted in such a state that synthetic fiber having a higher melting temperature, synthetic fiber having a lower melting temperature and adsorptive fiber are mixed to contact with in another and the contact points of said sythetic fiber having a lower melting temperature with other fibers are bound together by softening the synthetic fiber having a lower melting temperature.

2. An adsorptive fiber sheet wherein a nonwoven fabric of synthetic fiber constituted by a mixture of synthetic fiber having a higher melting temperature and synthetic fiber having a lower melting temperature is secured in a layer structure to at least one surface of a nonwoven fabric of adsorptive fiber which is constituted in such a state that synthetic fiber having a lower melting temperature and adsorptive fiber are mixed to contact with one another and the contact points of said synthetic fiber having a lower melting temperature with other fibers are bound together by softening the synthetic fiber having a lower melting temperature.

3. The adsorptive fiber sheet of claim 1 wherein said adsorptive fiber comprises activated carbon fiber.

4. The adsorptive fiber sheet of claim 2 wherein said adsorptive fiber comprises fiber of ion exchange resin.

5. The adsorptive fiber sheet of claim 1 wherein said adsorptive fiber comprises a combination of activates carbon fiber and ion exchange fiber.

6. The adsorptive fiber sheet of claim 1 wherein said synthetic fiber having a higher melting temperature and said synthetic fiber having a lower melting temperature are made integral with one another to form conjugated fiber having a higher melting temperature component and a lower melting temperature component.

7. The adsorptive fiber sheet of claim 6 wherein said conjugated fiber is constituted in such a manner synthetic high polymer having a higher melting temperature serves as a core component and synthetic high polomer having a lower melting temperature serves as a sheath component.

8. The adsorptive fiber sheet of claim 1 wherein nonwoven fabrics are secured to one another by allowing synthetic fiber having a lower melting temperature to be softened to bind in such a manner that no separation takes place therebetween.

9. The adsorptive fiber sheet of claim 1 wherein nonwoven fabrics are secured to one another by allowing fibers to be entangled together under the effect of needling in such a manner no separation takes place therebetween.

10. The adsorptive fiber sheet of claim 1 wherein a rigid sheet is embedded between two layers of nonwoven fabrics.

11. The adsorptive fiber sheet of claim 1 wherein said adsorptive fiber sheet is covered with an air permeable waterproofing sheet whereby it has waterproofness.

12. The adsorptive fiber sheet of claim 1 wherein said adsorptive fiber sheet is utilized as filtering means.

13. The adsorptive fiber sheet of claim 1 wherein said adsorptive fiber sheet is utilized as a rotary type filter.

14. The adsorptive fiber sheet of claim 13 wherein a plurality of blades of said rotary type filter are fixedly secured to a boss fixedly mounted on a rotational shaft or to a boss rotatably mounted on a stationary shaft in a spaced relation.

15. The adsorptive fiber sheet of claim 1 wherein a column-shaped member which is obtained by rolling said adsorptive fiber sheet is gastightly and liquidtightly covered with a gas and liquid impermeable film and the obtained column-shaped member is utilized as filtering means.

* * * * *